United States Patent
Tai et al.

(10) Patent No.: US 7,639,303 B2
(45) Date of Patent: Dec. 29, 2009

(54) METHOD AND APPARATUS FOR LENS AUTO-FOCUSING IN CAMERA MODULE TEST

(75) Inventors: Yu Tai, Chu-Nan (TW); Chien-I Chen, Chu-Nan (TW); Hai-Hung Wen, Chu-Nan (TW)

(73) Assignee: Altus Technology Inc., Chu-Nan, Miao-Li Hsien (TW)

( * ) Notice: Subject to any disclaimer, the term of this patent is extended or adjusted under 35 U.S.C. 154(b) by 460 days.

(21) Appl. No.: 11/309,916

(22) Filed: Oct. 27, 2006

(65) Prior Publication Data
US 2007/0211912 A1 Sep. 13, 2007

(30) Foreign Application Priority Data
Mar. 10, 2006 (CN) .................. 2006 1 0034362

(51) Int. Cl.
*H04N 5/232* (2006.01)
(52) U.S. Cl. .............. 348/349; 348/140; 348/187; 348/188; 348/335; 348/340
(58) Field of Classification Search .......... 348/140, 348/180, 187, 188, 189, 345, 175, 335, 340, 348/348, 349, 350, 353, 356, 357; 359/694–698, 359/823, 824; 396/89, 91–94, 125–128
See application file for complete search history.

(56) References Cited

U.S. PATENT DOCUMENTS

| 5,661,816 | A | * | 8/1997 | Fantone et al. ............... 382/100 |
|---|---|---|---|---|
| 5,669,440 | A | * | 9/1997 | Bauer et al. .................. 165/177 |
| 6,195,159 | B1 | * | 2/2001 | MacDonald et al. ......... 356/123 |
| 6,493,075 | B1 | * | 12/2002 | Huang et al. ............. 356/124.5 |
| 6,900,884 | B2 | * | 5/2005 | Alderson et al. .......... 356/124.5 |
| 7,453,581 | B2 | * | 11/2008 | Greve et al. .................. 356/609 |
| 2002/0154240 | A1 | * | 10/2002 | Tamai et al. ................. 348/345 |
| 2003/0063211 | A1 | * | 4/2003 | Watanabe et al. ........... 348/345 |
| 2005/0162517 | A1 | * | 7/2005 | Fujihara et al. .............. 348/187 |
| 2006/0245748 | A1 | * | 11/2006 | Chuang et al. ................. 396/89 |

* cited by examiner

*Primary Examiner*—Lin Ye
*Assistant Examiner*—Chriss S Yoder, III
(74) *Attorney, Agent, or Firm*—Zhigang Ma

(57) ABSTRACT

A lens auto-focusing method in camera module testing includes the following steps: providing testing equipment including a range finder, a signal processor and a driving member; providing an imaged object (20); providing an camera module including a lens module (10) and an image sensor, the view angle and the biggest value of the modulation transfer function of the lens module are both certain values, the image (30) of the imaged object is formed in the image sensor; the imaged object and the image formed thereby in the other side of the lens module are fixed; the imaged object and the image formed in the other side of the lens module are fixed; inputting an image distance tested by the range finder into the signal processor, the signal processor calculates a displacement for the driving member; the driving member drives the lens module to a focusing point.

9 Claims, 2 Drawing Sheets

METHOD AND APPARATUS FOR LENS AUTO-FOCUSING IN CAMERA MODULE TEST

FIELD OF THE INVENTION

The present invention generally relates to lens auto-focusing methods and, more particularly, to a lens auto-focusing method in camera module test and the apparatus employing the same.

DESCRIPTION OF RELATED ART

Nowadays, digital camera modules are in widespread use in a variety of portable electronic devices. For example, digital camera modules are now widely available as a special feature for handsets.

In handset camera module manufacturing, in most of the cases, the lens must be adjusted and focused before it can be locked at best focusing point. Auto-focusing tester has been proposed for using a motor and an algorithm to control focus of the lens of camera module at its best focusing point.

Sometimes, an auto-focusing tester uses an algorithm to search for the best focusing point by applying modulation transfer function (MTF) calculation with approximating step-by-step searching methodology. The method first calculates the MTF value of the certain area on the image and then compares the value with previous one. The motor moves forward or backward to the next step in accordance to the MTF comparison between the two MTF values mentioned above. However, the method cannot detect the best focusing point before the motor moves across the associating position, and the process of searching and focusing may take a relatively long time.

Accordingly, what is needed is a lens auto-focusing method in camera module test and the apparatus employing the same.

SUMMARY OF THE INVENTION

In one embodiment thereof, a lens auto-focusing method in camera module test includes the following steps: providing testing equipment, the testing equipment including a range finder, a signal processor and a driving member connected electrically; providing an imaged object; providing an camera module including a lens and an image sensor, the view angle and the biggest value of the modulation transfer function of the lens module are both certain values, the image of the imaged object is formed in the image sensor; the imaged object and the image formed thereby in the other side of the lens module are fixed; inputting an initial image distance tested by the range finder into the signal processor, the signal processor calculates an initial image height based on the initial image distance, and further calculates a displacement for the driving member, then the signal processor generates a controlling signal and sends the signal to the driving member to control it; and the driving member drives the lens module to a focusing point.

An apparatus employing the lens auto-focusing method for camera testing, the apparatus including a range finder, a signal processor and a driving member. The range finder is provided for measuring an image distance. The signal processor is provided for calculating the displacement of the lens module based on the linear equation of the changing of the image height and the displacement of the lens module. The driving member is provided for driving the lens module to move. The range finder, the signal processor and the driving member are connected electrically.

Other advantages and novel features will become more apparent from the following detailed description when taken in conjunction with the accompanying drawings.

BRIEF DESCRIPTION OF THE DRAWINGS

Many aspects of the lens auto-focusing method in camera module test and the apparatus employing the same can be better understood with reference to the following drawings. The components in the drawings are not necessarily drawn to scale, the emphasis instead being placed upon clearly illustrating the principles of the present digital camera module. Moreover, in the drawings, like reference numerals designate corresponding parts throughout the several views.

DETAILED DESCRIPTION OF THE INVENTION

An embodiment of a lens auto-focusing method in camera module test, and with the method, a testing equipment tests and focuses a camera module automatically. The testing equipment includes a range finder, a signal processor and a driving member. The range finder is provided for measuring distance such as an image distance. The signal processor is electrically connected with the range finder and the driving member to process the related signals. The driving member is a motor or a solenoid valve in the embodiment.

Figure 1:
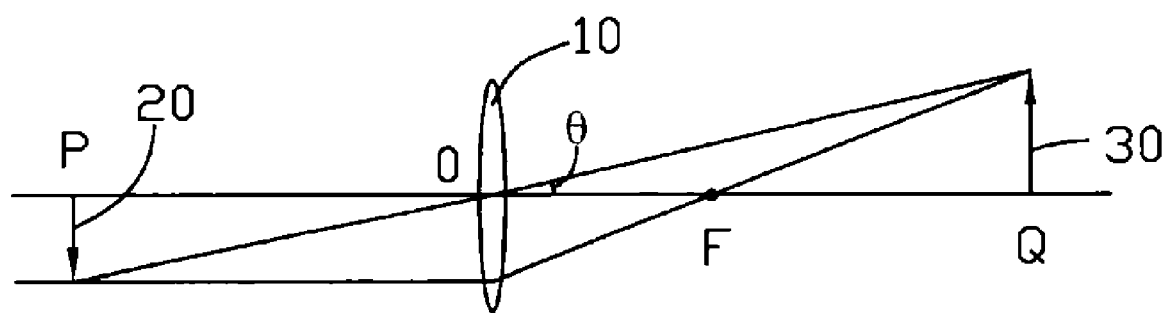
FIG. 1 is an imaging optical path view of a lens module used in an embodiment of the present invention in camera module test.

Referring to FIG. 1, a lens module 10 and an image sensor (not shown) is provided for the tested camera module. A point O represents an optical center of the lens module 10. A point F represents the position of a focus of the lens module 10. A point P represents the position of an imaged object 20. A point Q represents the position of the image sensor, that is, Q represents the position of the image formed by the object 20. P and Q are respectively in the opposite sides of the lens module 10. The distance between O and P is an object distance. The distance between O and Q is an image distance. The distance between O and F is a focal length of the lens module 10. An angle of θ is related to the view angle of lens module 10. In the embodiment, θ is a given value. In test, the position of P and Q is fixed. The driving member drives the lens module 10 to move until the image 30 comes into focus.

Figure 2:
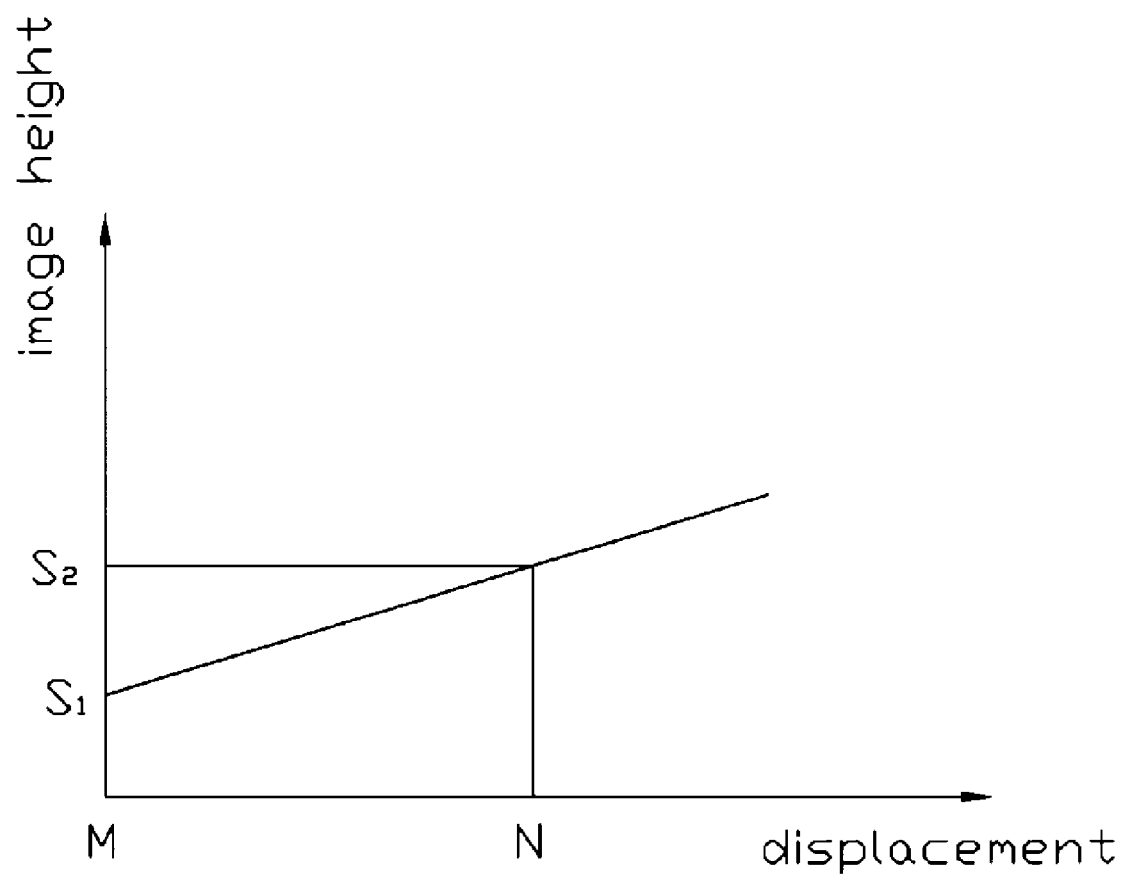
FIG. 2 is a graph showing the change in image height with respect to the displacement of the driving member in accordance with the embodiment of the invention.

Further referring to FIG. 2, when the lens module 10 is located in the initial position, the image height is S1, the object distance is p1, and the image distance is q1. When the lens module 10 is moved to the focusing point, the image height, the object distance and the image distance become S2, p2 and q2 respectively. On the basis of the Gaussian fiction formula shown as 1/p+1/q=1/f, wherein p and q respectively represent the object distance and the image distance when the lens module 10 is at a focusing point, and f is the focal length of the lens module 10, and the geometrical relations, S1=q1tgθ, S2=q2tgθ, and q2−q1=p1−p2 are true the following equations:

$$1/p2 + 1/q2 = 1/f \qquad (1),\text{ and}$$

$$S2 - S1 = tg\theta(q2-q1) = tg\theta(p1-p2) \qquad (2)$$

may be deduced.

As each of the camera modules tested in one batch has same structure, so the corresponding lens module 10 of each camera module has same performance. Based on the equation (2), the changing of the image height is in line with the changing of the image distance or the object distance. Because the object 20 and the image 30 are fixed, the displacement of driving member is equal to the changing of the object distance or the changing of the image distance. The changing of the image height represented by ΔS and the displacement of the driving member represented by x can be seen to be linear in this case and can be described by a linear equation (3):

$$\Delta S = mx \quad (3)$$

wherein $\Delta S = S2 - S1$, $m = \tan \theta$, and m is a constant.

In the embodiment, the initial image height is S1, an initial position of the driving member is a point M. The distance between the initial position M and a final position is a displacement of the driving member is x, and the image height when the driving member has moved is y. Using the equation (3), the following functions can be deduced:

$$X = \Delta S/m = (y - S1)/m \quad (4)$$

$$Y = mx + S1 \quad (5)$$

$$X = n(y - S1) \quad (6)$$

Wherein n is a constant linear coefficient, and $n = 1/m$.

As each of the camera modules tested in one batch has same constitution, so the biggest MTF value of the lens module 10 of each camera module is identical, wherein the biggest MTF value is also defined as high MTF value, and the high MTF value of the lens module 10 is a fixed value. The lens module 10 is fixed in the best position when the MTF value thereof is the high MTF. In the embodiment, the best position is at point N, and the image height therefore becomes S2. Because the high MTF value is a fixed value, S2 is also a fixed value.

The high MTF value of the lens module 10 are input into the signal processor of the testing equipment. In testing, when S1 is determined, the displacement of the driving member x can be deduced to be $n(S2-S1)$ on the basis of equation (6). The displacement of the lens module 10 is equal to that of the driving member.

The embodiment of the lens auto-focusing method in camera module testing includes the following steps:

Providing a testing equipment, and the testing equipment includes a range finder, a signal processor and a driving member.

Providing an imaged object 20, at a certain position.

Providing a camera module, and the camera module includes a lens module 10 and an image sensor. The position of the image sensor is fixed to the imaged object 20. The image 30 is formed by the object 20 on the image sensor. The focal length and the high MTF of the lens module 10 are fixed values. The imaged object 20 and the image 30 formed thereby on the other side of the lens module 10 are fixed. The high MTF value is input into the signal processor before testing.

An initial image distance are measured by the range finder and sent to the signal processor. Based on the initial image distance and the equation of $S1 = q1 \mathrm{tg}\theta$, an initial image height is calculated by the signal processor. The displacement of the driving member can be deduced from the high MTF value and equation (6). The signal processor generates a controlling signal. The controlling signal is sent to the driving member to control the driving member.

The driving member drives the lens module 10 to a focusing point. The auto-focusing is finished.

The lens auto-focusing method can focus a camera module by using only two frames of image. Therefore, the method in the embodiment reduces focusing time to less than half that of a step-by-step searching method, thus greatly improving the throughput in camera module mass manufacturing.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of lens auto-focusing in camera module test, comprising the following steps:

providing testing equipment, wherein the testing equipment comprises a range finder, a signal processor and a driving member all connected electrically;

providing an imaged object;

providing an camera module comprising a lens and an image sensor, wherein a view angle and the biggest value of modulation transfer function of the lens module are both certain values; an image of the imaged object is formed in the image sensor; the imaged object and the image formed thereby in the other side of the lens module are fixed;

inputting an initial image distance tested by the range finder into the signal processor, wherein the signal processor calculates the initial image height based on the initial image distance, and further calculates a displacement for the driving member using a linear equation: $x = n(y - S1)$, wherein x is the displacement of the driving member, y is the image height when the lens at focusing point, S1 is the initial image height, n is equal to $1/\tan \theta$, and $\theta$ is the view angle of the lens; and generating a controlling signal via the signal processor and sending the signal to the driving member to control it, driving the lens module to a focusing point via the driving member.

2. The lens auto-focusing method in camera module test as claimed in claim 1, wherein the biggest modulation transfer function value of the lens module is input into the signal processor before testing.

3. The lens auto-focusing method in camera module test as claimed in claim 1, wherein the driving member is a driving motor or a solenoid valve.

4. The lens auto-focusing method in camera module test as claimed in claim 1, wherein the displacement of the driving member is equal to the displacement of the lens module during the test.

5. The lens auto-focusing method in camera module test as claimed in claim 1, wherein the signal processor is electrically connected with the range finder and the driving member.

6. An apparatus for lens auto-focusing in camera module test, wherein the camera module comprises a lens module, a view angle and the biggest value of the modulation transfer function of the lens module are certain values, an imaged object and an image formed thereby in the other side of the lens module are fixed, the apparatus comprising:

a range finder for measuring an image distance;

a signal processor calculating the displacement of the lens module based on an initial image distance tested by the range finder and a linear equation: $x = n(y - S1)$, wherein x is the displacement of the driving member, y is the image height when the lens at focusing point, S1 is the initial image height, n is equal to $1/\tan \theta$, and $\theta$ is the view angle of the lens; and a driving member for driving the lens module to move, and the range finder, the signal processor and the driving member being connected electrically.

7. The testing equipment as claimed in claim 6, wherein the image height is a certain value when the lens module is in the best position.

8. The testing equipment as claimed in claim 6, wherein driving member is a driving motor or a solenoid.

9. The testing equipment as claimed in claim 6, wherein the displacement of the lens module is equal to the displacement of the driving member during the test.

* * * * *

UNITED STATES PATENT AND TRADEMARK OFFICE
CERTIFICATE OF CORRECTION

PATENT NO.         : 7,639,303 B2                                        Page 1 of 1
APPLICATION NO.  : 11/309916
DATED              : December 29, 2009
INVENTOR(S)       : Tai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 523 days.

Signed and Sealed this

Ninth Day of November, 2010

David J. Kappos
*Director of the United States Patent and Trademark Office*